(12) United States Patent
Takahashi

(10) Patent No.: US 8,648,767 B2
(45) Date of Patent: Feb. 11, 2014

(54) COMMUNICATION DEVICE

(75) Inventor: Yoshitaka Takahashi, Kanagawa (JP)

(73) Assignee: Sony Corporation (JP)

( * ) Notice: Subject to any disclaimer, the term of this patent is extended or adjusted under 35 U.S.C. 154(b) by 317 days.

(21) Appl. No.: 13/152,409

(22) Filed: Jun. 3, 2011

(65) Prior Publication Data

US 2011/0306296 A1  Dec. 15, 2011

(30) Foreign Application Priority Data

Jun. 11, 2010  (JP) ................ P2010-134112

(51) Int. Cl.
*H01Q 21/00* (2006.01)
*H01Q 11/12* (2006.01)
*G08B 13/14* (2006.01)

(52) U.S. Cl.
USPC ..... 343/867; 343/742; 340/572.1; 340/572.7; 340/572.8

(58) Field of Classification Search
USPC .......... 343/742, 867; 340/572.1, 572.7, 572.8
See application file for complete search history.

(56) References Cited

U.S. PATENT DOCUMENTS

| 6,388,628 | B1 * | 5/2002 | Dettloff et al. | 343/742 |
| 6,570,541 | B2 * | 5/2003 | Dettloff | 343/742 |
| 7,474,220 | B2 * | 1/2009 | Choi et al. | 340/572.7 |
| 2005/0242959 | A1 * | 11/2005 | Watanabe | 340/572.7 |

FOREIGN PATENT DOCUMENTS

| EP | 2259212 A1 | 12/2010 |
| JP | 2005033629 A | 2/2005 |
| JP | 2009232397 A | 10/2009 |

* cited by examiner

*Primary Examiner* — Hoang V Nguyen
(74) *Attorney, Agent, or Firm* — Lerner, David, Littenberg, Krumholtz & Mentlik, LLP

(57) ABSTRACT

There is provided a communication device that includes an antenna section including a plurality of loop coils that are combined in a polygonal pyramid shape, and a communication section configured to perform contactless communication with another communication device using the antenna section. The plurality of loop coils may include two adjacent loop coils, and magnetic fields generated by the two loop coils may have mutually opposite phases.

9 Claims, 9 Drawing Sheets

FIG. 5
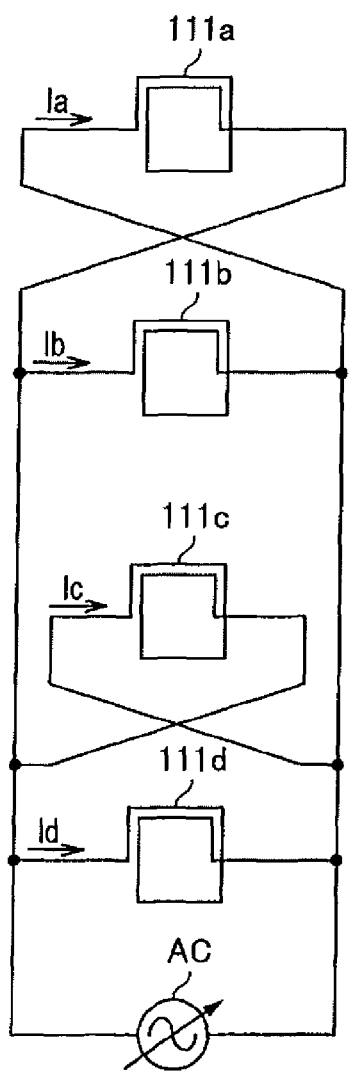
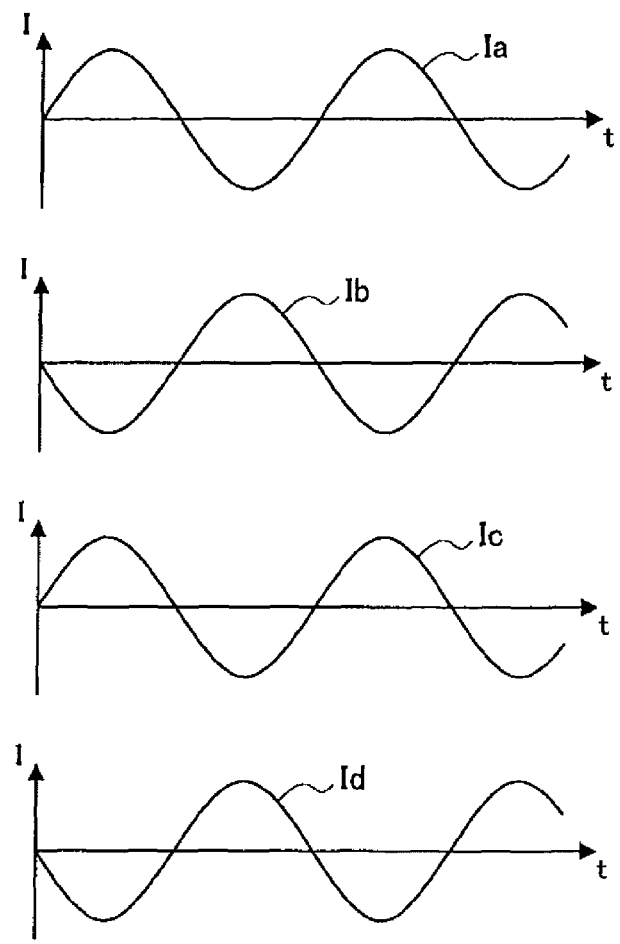

COMMUNICATION DEVICE

CROSS-REFERENCE TO RELATED APPLICATION

The present application claims priority from Japanese Patent Application No. JP 2010-134112 filed in the Japanese Patent Office on Jun. 11, 2010, the entire content of which is incorporated herein by reference.

BACKGROUND

The present disclosure relates to a communication device.

In recent years, contactless communication, which uses contactless communication devices such as a mobile phone on which a contactless IC (Integrated Circuit) card, an RFID (Radio Frequency IDentification) tag, or a contactless IC chip is mounted and readers/writers, has been widely carried out. As the contactless communication has come into widespread use, readers/writers have often been placed at various places. Therefore, not only does the miniaturization of the reader/writer be desired, but the expansion of the communicable range of the reader/writer also is desired. If a reader/writer has a wide communicable range, it would be possible to tolerate a displacement, which can occur when a contactless communication device is held over the reader/writer, to a certain degree.

Thus, there have been developed technologies for extending the communicable range of a reader/writer using a plurality of loop antennae. For example, JP 2009-232397A describes a technology for extending the communicable range by arranging a plurality of loop antennae on the same plane in a partially overlapping manner. In addition, JP2005-33629A describes a technology for extending the communicable range by stereoscopically combining five loop antennae.

SUMMARY

However, when a plurality of loop antennae are arranged on the same plane as described in JP 2009-232397A, problems would arise that the area in which the antennae are disposed could increase, and when the communicable range above the plane is attempted to be extended, the size of the reader/writer could increase correspondingly.

Further, when a plurality of loop antennae are combined stereoscopically as described in JP2005-33629A, magnetic fields that are generated by two adjacent loop antennae could mutually interfere with each other. Thus, there has been a problem that the communicable range is difficult to be extended sufficiently.

In light of the foregoing, it is desirable to provide a novel and improved communication device with a compact device structure and with a communicable range that can be extended sufficiently.

According to an embodiment of the present disclosure, there is provided a communication device that includes an antenna section including a plurality of loop coils that are combined in a polygonal pyramid shape, and a communication section configured to perform contactless communication with another communication device using the antenna section. The plurality of loop coils may include two adjacent loop coils, and magnetic fields generated by the two loop coils may have mutually opposite phases.

According to another embodiment of the present disclosure, there is provided a communication device that includes an antenna section including a plurality of loop coils that are combined in a conical shape, and a communication section configured to perform contactless communication with another communication device using the antenna section. The plurality of loop coils may include two adjacent loop coils, and magnetic fields generated by the two loop coils may have mutually opposite phases.

According to further another embodiment of the present disclosure, there is provided a communication device that includes an antenna section including a plurality of loop coils that are combined in a projecting shape, and a communication section configured to perform contactless communication with another communication device using the antenna section. The plurality of loop coils may include two adjacent loop coils, and magnetic fields generated by the two loop coils may have mutually opposite phases.

According to such a configuration, a plurality of loop antennae can be combined without their magnetic fields mutually interfering with each other. Further, as the directivities of the respective loop antennae differ from one another, a communicable range that is sufficiently wide can be obtained as the entire antenna section.

The antenna section may further include a plurality of antenna substrates on which the respective loop coils are disposed, and may have a stereoscopic shape formed by stereoscopically combining the plurality of antenna substrates.

The stereoscopic shape may be a polygonal pyramid shape, and the antenna section may form the polygonal pyramid shape with the antenna substrates combined so as correspond to respective side faces of the polygonal pyramid shape.

The antenna section with the polygonal pyramid shape may be arranged such that a bottom face of the antenna section is parallel with a reference plane that serves as a reference when the other communication device is held over the communication device.

The number of the plurality of loop coils disposed may be even.

The communication device may further include a magnetic material disposed on at least one of rear surfaces of the plurality of loop coils.

According to still another embodiment of the present disclosure, there is provided a communication device that includes an antenna section including a plurality of loop coils that are combined to form a shape with mutually angled faces, and a communication section configured to perform contactless communication with another communication device using the antenna section. The plurality of loop coils may include two adjacent loop coils, and magnetic fields generated by the two loop coils may have mutually opposite phases.

According to yet another embodiment of the present disclosure, there is provided a communication device including an antenna section including a plurality of loop coils that are combined in a hemispherical shape, and a communication section configured to perform contactless communication with another communication device using the antenna section. The plurality of loop coils may include two adjacent loop coils, and magnetic fields generated by the two loop coils may have mutually opposite phases.

According to the embodiments of the present disclosure described above, a compact device structure can be provided and the communicable range can be extended sufficiently.

BRIEF DESCRIPTION OF THE DRAWINGS

FIG. 5 is an explanatory diagram illustrating an example of wires of the antenna section of the reader/writer in accordance with the same embodiment;

DETAILED DESCRIPTION OF THE EMBODIMENTS

Figure 1:
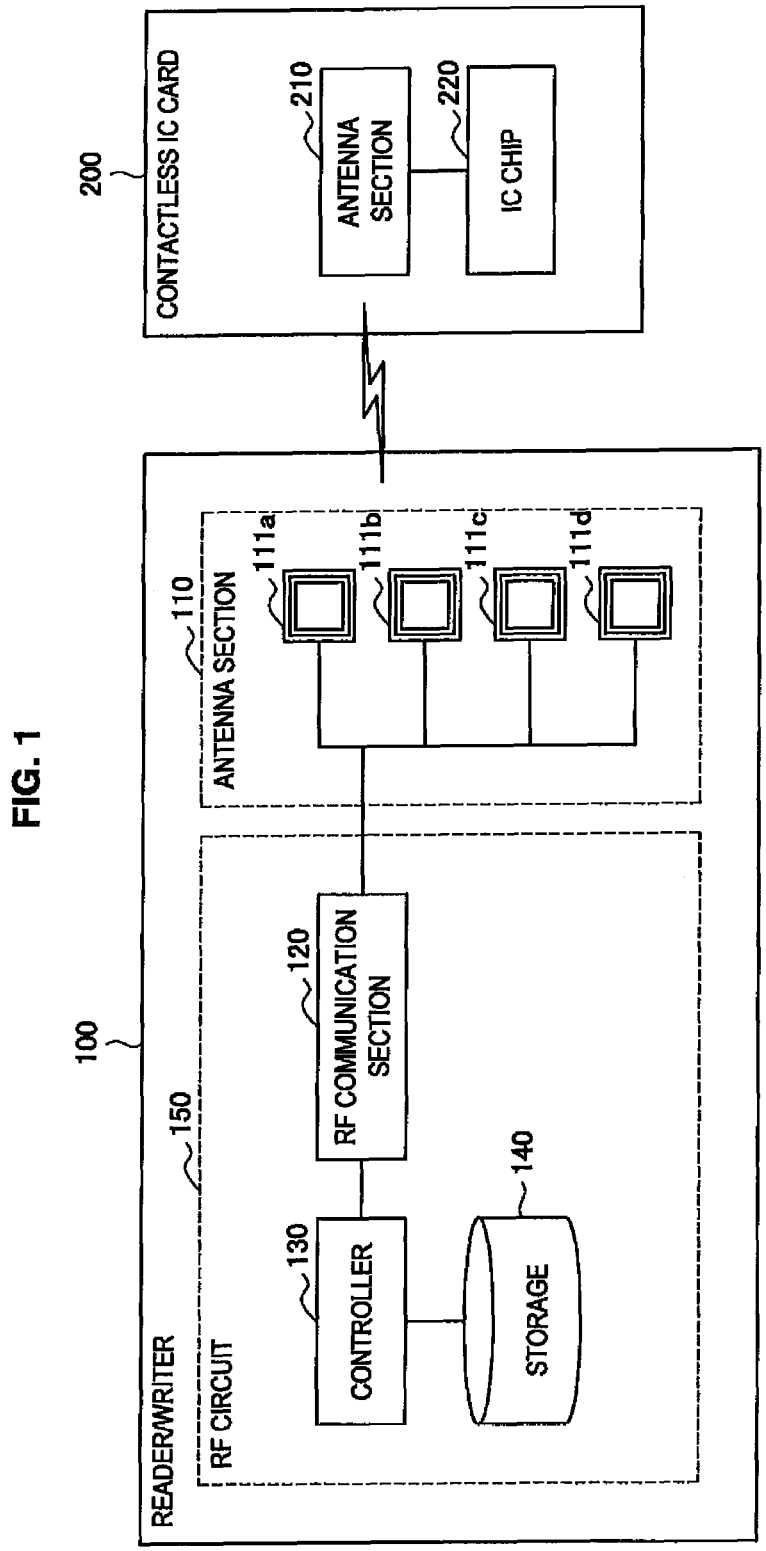
FIG. 1 is a block diagram showing an exemplary configuration of a reader/writer in accordance with the first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. First Embodiment
1-1. Overview of Contactless Communication
1-2. Configuration of Reader/Writer
1-3. Configuration of Antenna Section of Reader/Writer
1-4. Summary of the embodiment
2. Second Embodiment
3. Supplements

1. First Embodiment (1-1. Overview of Contactless Communication)

First, an overview of contactless communication that is performed by a reader/writer in accordance with the first embodiment of the present disclosure will be described.

Herein, a contactless IC card will be described as an example of a contactless communication device. The contactless IC card includes, within its outer casing for a thin card, an antenna for performing contactless communication with a reader/writer, and an IC chip that has mounted thereon an integrated circuit (IC) capable of executing predetermined arithmetic processing. Accordingly, the contactless IC card can perform contactless communication with a reader/writer using an electromagnetic wave. Thus, data can be written to and read from the contactless IC card only by placing the contactless IC card within the effective range of an electromagnetic wave that is radiated from the reader/writer (that is, only by passing the contactless IC card over the reader/writer). As the position of the contactless IC card need not be fixed by, for example, being inserted into and removed from the reader/writer, high usability is provided and rapid data transmission/reception are possible. In addition, as the data is difficult to be altered or tampered, high security is provided. Further, there is another advantage that the card can be reused a number of times if the data is rewritten. Therefore, the range of applications of contactless IC cards is expanding. Contactless IC cards are currently used for, for example, electronic money cards, transportation cards, personal authentication cards, rewards cards, coupon cards, electronic ticket cards, electronic payment cards, and the like.

The reader/writer in accordance with this embodiment performs contactless communication with the aforementioned contactless IC card. The reader/writer is typically used by being built in or externally attached to a host device. As the range of applications of contactless IC cards has been expanding, host devices which reader/writer devices are built in or externally attached to have also come in a variety of types. The reader/writer in accordance with this embodiment is used by being built in or externally attached to a variety of electronic devices serving as a host device, such as an automatic ticket gate, an accounting machine installed at a shop, a personal computer, a user terminal such as a home information appliance, a vending machine for various merchandise or for train or bus tickets, a POS terminal, a kiosk terminal, an ATM of a financial institution, and a portable terminal like a mobile phone. Herein, the size of a reader/writer, when built in a host device, in particular, would be restricted due to limitations in the installation space within the host device.

Contactless communication that is performed between the aforementioned contactless IC card and reader/writer is wireless communication over a distance as short as several cm, for example. The contactless communication is "symmetric communication" in which a frequency band of a predetermined frequency (e.g., 13.56 MHz) is used as a carrier, the communication rate is 212 kbps, and no subcarrier is used. An ASK (Amplitude Shift Keying) modulation scheme can be used as a modulation scheme, while a Manchester encoding scheme can be used as a coding scheme. Through such contactless communication, transactions are repeated in such a manner that the reader/writer issues various commands to the contactless IC card in accordance with instructions from the host device, and in turn, the contactless IC card responds to the commands, so that information on a predetermined service is transmitted/received.

Herein, the position of the contactless IC card is not fixed by, for example, being inserted into and removed from the reader/writer as described above. Accordingly, when the contactless IC card performs contactless communication with the reader/writer, there is a possibility that the contactless IC card could become displaced from the reader/writer. In order to improve the usability of the contactless IC card, there is demand for a reader/writer that can tolerate the aforementioned displacement to the maximum possible degree and can perform contactless communication with the contactless IC card even if a user does not pay special attention to the position of the contactless IC card. The degree of tolerance of a reader/writer for a displacement of a contactless IC card from the reader/writer depends on the communicable range of the reader/writer. Hereinafter, the configuration of an antenna section of a related reader/writer, and a communicable range obtained by the antenna section will be described with reference to FIGS. 10 and 11.

Figure 10:
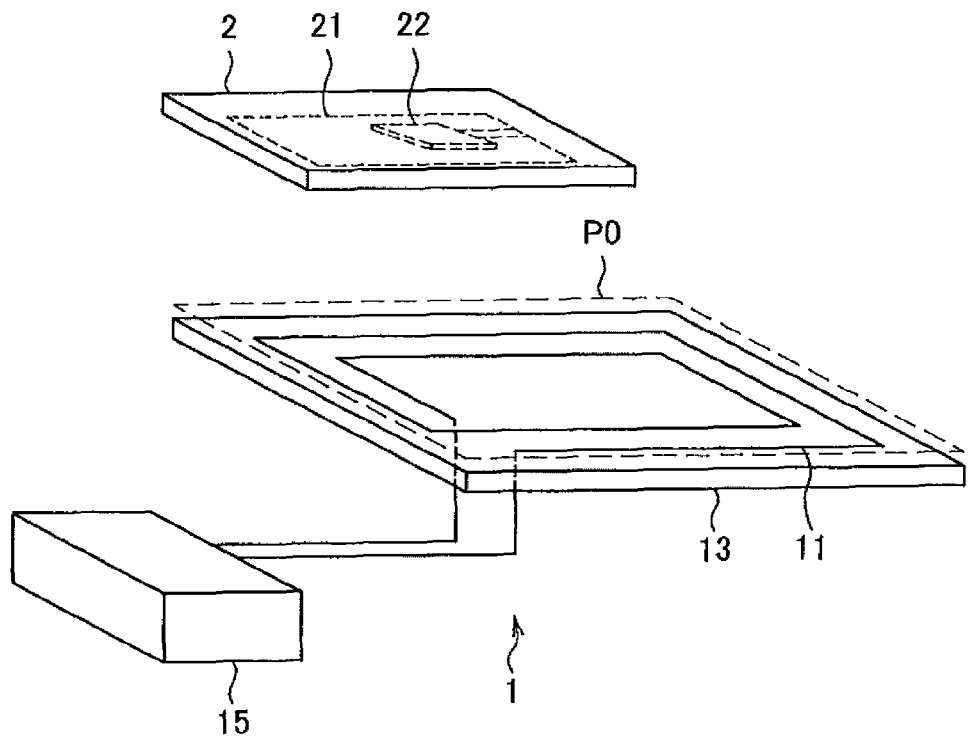
FIG. 10 is a schematic perspective view illustrating an antenna section of a related reader/writer.

FIG. 10 is a schematic perspective view illustrating an antenna section of a related reader/writer 1. Referring to FIG. 10, the antenna section of the reader/writer 1 has a loop antenna 11. The loop antenna 11 is a coil with a predetermined inductance. The loop antenna 11 is connected to an RF circuit 15, and is supplied with an alternating current from the RF circuit 15 to thereby generate a magnetic field (a carrier) with a predetermined frequency. The loop antenna 11 is disposed on a square antenna substrate 13. The loop antenna 11 has approximately the same shape as the antenna substrate 13. The RF circuit 15 performs contactless communication with a contactless IC card 2 using a carrier generated by the loop antenna 11.

The contactless IC card 2 has an antenna section 21 and an IC chip 22. When the contactless IC card 2 is held over the reader/writer 1, the antenna section 21 receives a carrier generated by the loop antenna 11. The IC chip 22 uses direct-current components of the carrier as a driving voltage. In addition, the IC chip 22 extracts alternating-current components of the carrier as data, and processes the data. Herein, a plane that serves as a reference when the contactless IC card 2 is held over the reader/writer 1 is a reference plane P0. The reference plane P0 is a plane on which the IC card 2 can be brought closest to the reader/writer 1 (a 0-distance plane).

Figure 11:
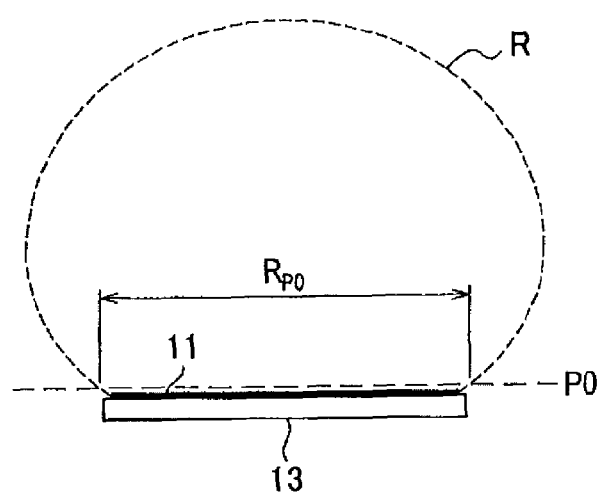
FIG. 11 is a schematic longitudinal sectional view illustrating a communicable range obtained by the antenna section of the related reader/writer.

FIG. 11 is a schematic longitudinal sectional view illustrating a communicable range R obtained by the antenna section of the related reader/writer 1 shown in FIG. 10. The communicable range refers to a range in which a magnetic field (a carrier) generated by the loop antenna 11 can be received by the antenna section 21 of the contactless IC card 2 with a magnetic field strength that is sufficient to perform contactless communication. Herein, the communicable range above the reference plane P0, in particular, is shown as a communicable range RP0. The degree of tolerance for a displacement of the contactless IC card 2 from the reader/writer 1 above the reference plane P0 is determined by the communicable range RP0. When the communicable range RP0 is wide, the aforementioned displacement would be tolerated to a certain degree. In such a case, even when the contactless IC card 2 has been displaced from the reader/writer 1 to a certain degree, the contactless IC card 2 is still able to perform contactless communication with the reader/writer 1. Meanwhile, when the communicable range RP0 is narrow, the aforementioned displacement would be tolerated only for a short distance. In such a case, when the contactless IC card 2 has been displaced from the reader/writer 1 even by a small distance, it would be difficult for the contactless IC card 2 to perform contactless communication with the reader/writer 1.

Herein, the communicable range RP0 is defined as a cross section of the communicable range R above the reference plane P0. When the loop antenna 11 is disposed such that its loop plane (a plane formed by the coil loop) is parallel with the reference plane P0, the communicable range RP0 has about approximately the same size as the loop antenna 11. Accordingly, when the communicable range RP0 is attempted to be extended, the size of the loop antenna 11 will increase correspondingly, which in turn increases the size of the reader/writer 1. Thus, when the size of the reader/writer 1 is restricted, the size of the loop antenna 11 is difficult to be increased and thus the communicable range RP0 is difficult to be extended. Therefore, when the reader/writer 1 is built in a limited space of a host device, for example, it would be difficult to extend the communicable range RP0 of the reader/writer 1.

Note that when the amount of current supplied to the loop antenna 11 is increased in the aforementioned example, the communicable range R will extend in a direction perpendicular to the loop plane of the loop antenna 11. However, the communicable range R will hardly extend in other directions. This is because the loop antenna 11 has directivity in a direction perpendicular to the loop plane. Thus, in the aforementioned example, increasing the amount of current supplied to the loop antenna 11 will not allow the communicable range RP0 to extend sufficiently.

In addition, though not shown, when the antenna section is formed by arranging a plurality of loop antennae 11 on the same plane, a communicable range RP0 obtained by each loop antenna 11 has approximately the same size as the loop antenna 11. Accordingly, a communicable range above the reference plane P0 that is obtained by the entire antenna section will not exceed the sum of the communicable ranges RP0 of the respective loop antennae 11. Thus, this configuration can be considered the same as when the antenna section has a single loop antenna 11. That is, when the communicable range RP0 is attempted to be extended, the area in which the loop antenna 11 is disposed will increase correspondingly, which in turn increases the size of the reader/writer 1.

(1-2. Configuration of Reader/Writer)

Next, an exemplary configuration of a reader/writer 100 in accordance with the first embodiment of the present disclosure will be described with reference to FIG. 1. FIG. 1 is a block diagram showing an exemplary configuration of the reader/writer 100 in accordance with this embodiment. As shown in FIG. 1, the reader/writer 100 performs contactless communication with a contactless IC card 200 that is a contactless communication device in accordance with this embodiment.

The reader/writer 100 includes an antenna section 110 and an RF circuit 150. The RF circuit 150 further includes an RF communication section 120, a controller 130, and storage 140. The RF circuit 150 is an exemplary communication section of the reader/writer of the present disclosure.

The antenna section 110 includes four loop antennae 111a to 111d that are combined stereoscopically. The loop antennae 111a to 111d are coils with a predetermined inductance. Each of the loop antennae 111a to 111d generates a magnetic field (a carrier) with a predetermined frequency by being supplied with an alternating current from the RF circuit 150. The shapes and the arrangement of the loop antennae 111a to 111d will be described later.

The RF communication section 120 has functions of supplying power to the contactless IC card 200, and transmitting and receiving predetermined commands and data to/from the contactless IC card 200 using the antenna section 110 as a single high-directivity antenna. Specifically, the RF communication section 120 generates a magnetic field (a carrier) with a predetermined frequency (e.g., 13.56 MHz) from the antenna section 110, and supplies power to the contactless IC card 200 using the carrier. In addition, the RF communication section 120 modulates the carrier in accordance with an instruction from the controller 130 to transmit predetermined commands and data to the contactless IC card 200. Further, the RF communication section 120 receives a carrier, which has been subjected to load modulation by the contactless IC card 200, using the antenna section 110. Furthermore, the RF communication section 120 demodulates the carrier to acquire commands and data transmitted from the contactless IC card 200, and outputs them to the controller 130.

The controller 130 is a microprocessor or the like, and controls each section in the reader writer 100 and performs predetermined arithmetic processing. The controller 130 operates in accordance with a program stored in the storage 140, and controls arithmetic processing, command generation, and transmission/reception of various information that are related to a predetermined service, for example. Accordingly, the reader/writer 100 can execute a series of processing such as card detection (polling) of, mutual authentication with, data writing to, and data reading from the contactless IC card 200.

The storage 140 is, for example, a storage device such as ROM (Read Only Memory), RAM (Random Access Memory), semiconductor memory like flash memory, and a hard disk drive, and stores various information permanently or temporarily. For example, the storage 140 stores various data such as a program for operating the controller 130 to provide a predetermined service via contactless communication, data acquired from the contactless IC card 200, and data operated by the controller 130.

The reader/writer 100 can also include an interface (not shown) for connection to a host device or another circuit. An interface refers to, for example, a UART (Universal Asynchronous Receiver Transmitter), a network terminal, or the like. With such an interface, the reader/writer 100 can transmit a command to the contactless IC card 200 in accordance with a transmission instruction from a host device, and transmit data acquired from the contactless IC card 200 to the host device.

Meanwhile, the contactless IC card 200 that performs contactless communication with the reader/writer 100 includes an antenna section 210 and an IC chip 220. With the antenna section 210, the contactless IC card 200 receives an electromagnetic wave (a carrier) from the reader/writer 100. The IC chip 220 uses direct-current components of the carrier as a driving voltage. In addition, the IC chip 220 extracts alternating-current components of the carrier as data, and processes the data.

(1-3. Configuration of Antenna Section of Reader/Writer)

Figure 2:
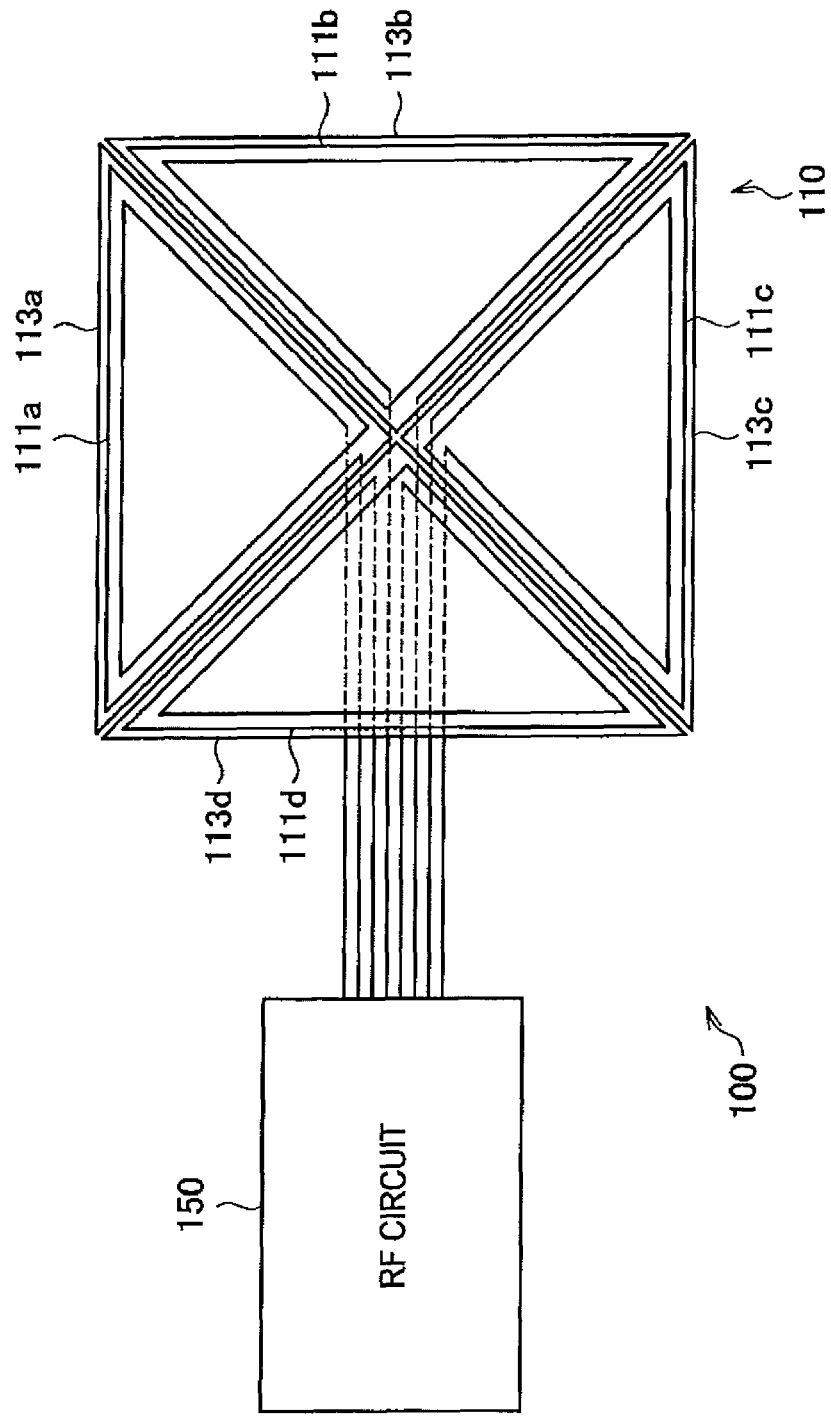
FIG. 2 is a schematic top view illustrating an antenna section of the reader/writer in accordance with the same embodiment.

Next, the antenna section 110 of the reader/writer 100 in accordance with the first embodiment of the present disclosure will be described with reference to FIGS. 2 to 6. FIG. 2 is a schematic top view illustrating the antenna section 110 of the reader/writer 100 in accordance with this embodiment.

Referring to FIG. 2, the antenna section 110 of the reader/writer 100 in accordance with this embodiment includes four loop antennae 111a to 111d that are combined stereoscopically. The loop antennae 111a to 111d are disposed on antenna substrates 113a to 113d, respectively. Herein, each of the antenna substrates 113a to 113d is a triangular plate-form member formed of dielectric, for example. The antenna substrates 113a to 113d are combined in a quadrangular pyramid shape. The loop antennae 111a to 111d are coils, each formed of a wire of metal such as copper or aluminum, and are disposed on the antenna substrates 113a to 113d, respectively. The coil shape of each of the loop antennae 111a to 111d is approximately the same triangular shape as that of each of the antenna substrates 113a to 113d.

Figure 3:
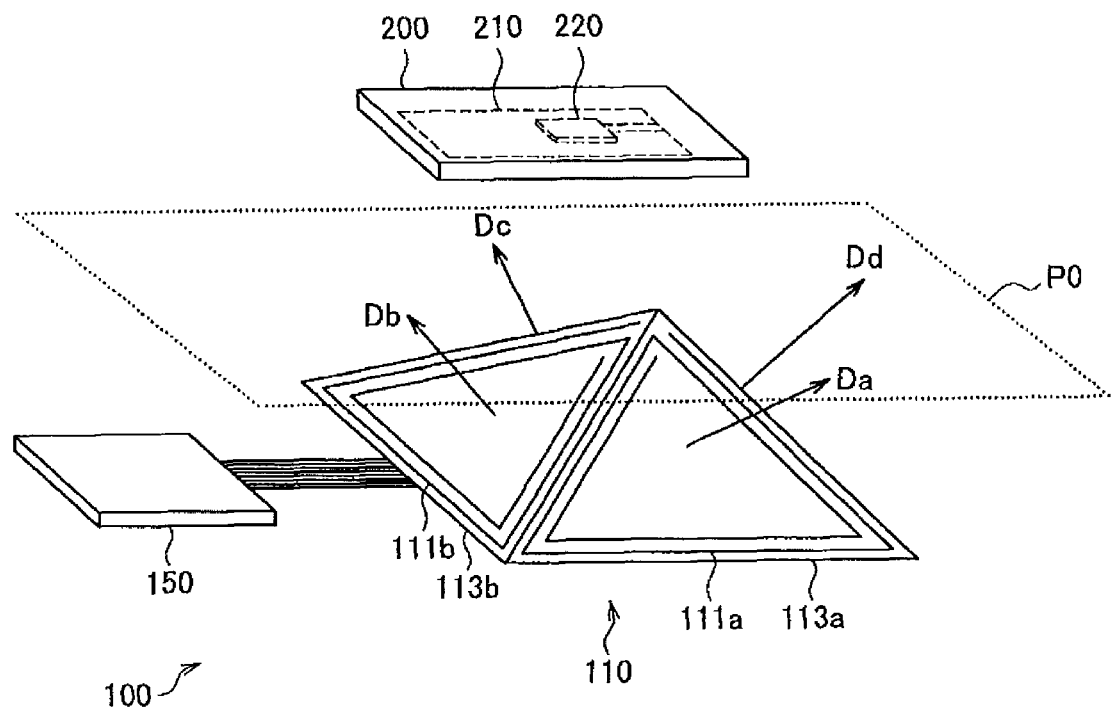
FIG. 3 is a schematic perspective view illustrating the antenna section of the reader/writer in accordance with the same embodiment.

FIG. 3 is a schematic perspective view further illustrating the antenna section 110 of the reader/writer 100 in accordance with the first embodiment of the present disclosure. Referring to FIG. 3, the antenna substrates 113a and 113b on which the loop antennae 111a and 111b are disposed, respectively are built such that the antenna substrates 113a and 113b correspond to the respective side faces of the quadrangular pyramid shape. The loop antennae 111c and 111d and the antenna substrates 113c and 113d are not shown as they are located on the rear side of the antenna section 110. However, the loop antennae 111c and 111d and the antenna substrates 113c and 113d are built in a similar way to the loop antennae 111a and 111b and the antenna substrates 113a and 113b shown in the drawing. As described above, the antenna section 110 has a quadrangular pyramid shape in which the antenna substrates 113a to 113d are combined stereoscopically. In other words, the antenna substrates 113a to 113d form the respective side faces of the quadrangular pyramid shape of the antenna section 110.

The RF circuit 150 performs contactless communication with the contactless IC card 200 using the antenna section 110, which includes the loop antennae 111a to 111d, as a single antenna. With regard to the loop antennae 111a to 111d disposed on the antenna substrates 113a to 113d, respectively, which are combined in a quadrangular pyramid shape, each loop plane (a plane formed by each coil loop) is mutually tilted with respect to one another. Accordingly, directivity directions Da to Dd, which are perpendicular to the respective loop planes, of the loop antennae 111a to 111d differ from one another. Thus, the RF circuit 150 can perform contactless communication with the contactless IC card 200 using the antenna section 110 as a high-directivity antenna that has four mutually different directivity directions Da to Dd.

Herein, a plane that serves as a reference when the contactless IC card 200 is held over the reader/writer 100 is a reference plane P0. The reference plane P0 is a plane on which the IC card 200 can be brought closest to the reader/writer 100 (a 0-distance plane). In this embodiment, the bottom face of the quadrangular pyramid shape obtained by combining the antenna substrates 113a to 113d is parallel with the reference plane P0. In other words, the apex of the quadrangular pyramid shape is opposite the reference plane P0. The antenna substrates 113a to 113d, which correspond to the respective side faces of the quadrangular pyramid shape, are tilted at an identical tilt angle with respect to the reference plane P0. Thus, the directivity directions Da to Dd, which are perpendicular to the respective loop planes of the loop antennae 111a to 111d disposed on the antenna substrates 113a to 113d, are tilted with respect to the reference plane P0. Specifically, the directivity directions Da to Dd of the loop antennae 111a to 111d are four directions that extend radially toward the reference plane P0 as shown.

Figure 4:
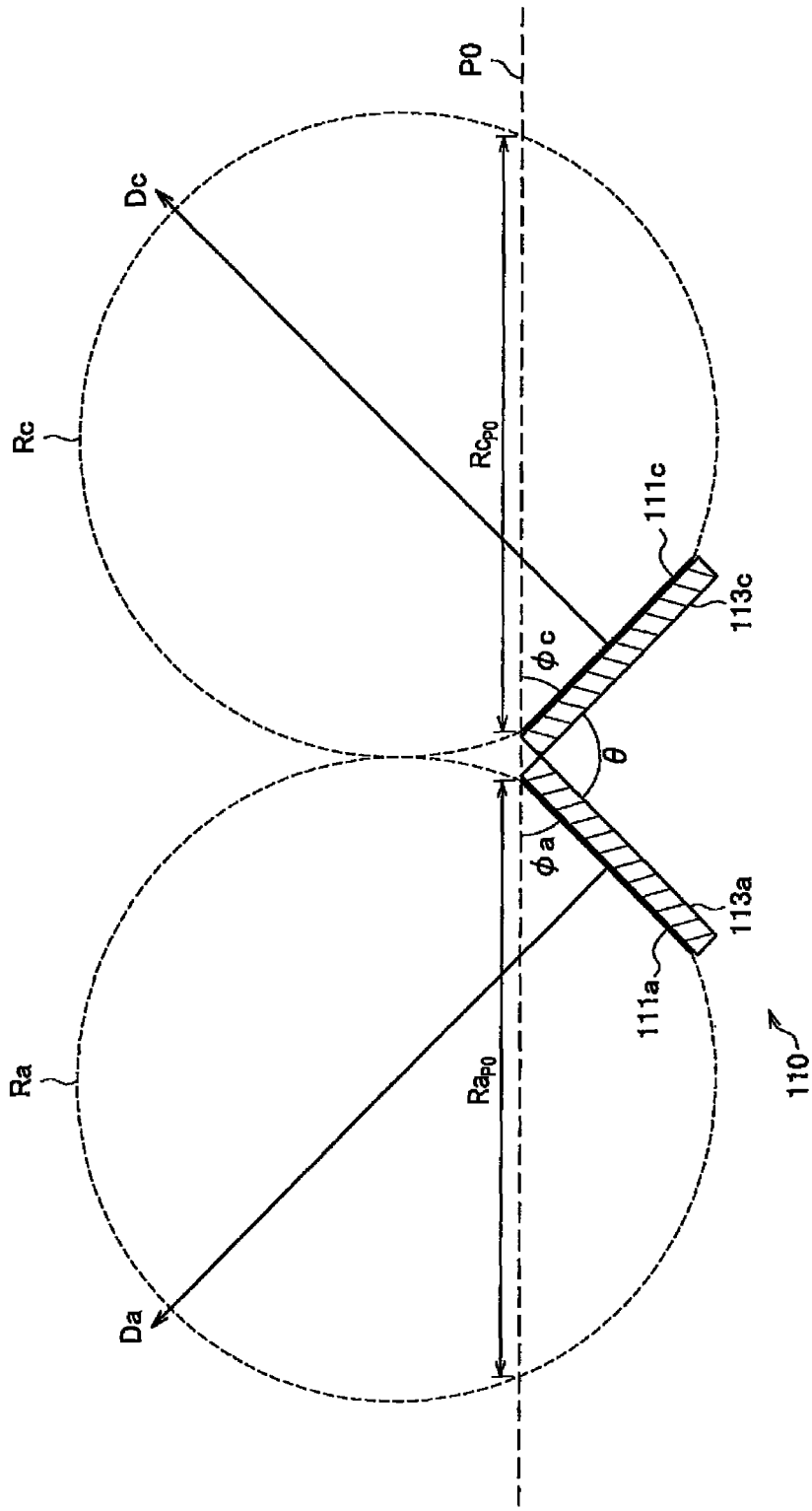
FIG. 4 is a schematic longitudinal sectional view illustrating a communicable range obtained by the antenna section of the reader/writer in accordance with the same embodiment.

FIG. 4 is a schematic longitudinal sectional view illustrating a communicable range obtained by each loop antenna of the antenna section 110 of the reader/writer 100 in accordance with the first embodiment of the present disclosure. Herein, the loop antenna 111a and the loop antenna 111c will be described as an example. Referring to FIG. 4, the loop antenna 111a and the loop antenna 111c that are disposed on the antenna substrate 113a and the antenna substrate 113c, respectively are shown. The antenna substrate 113a and the antenna substrate 113c correspond to, among the antenna substrates 113a to 113d combined in a quadrangular pyramid shape, two opposite side faces of the quadrangular pyramid shape. The communicable range refers to a range in which a magnetic field (a carrier) generated by the loop antenna 111a or the loop antenna 111c can reach the antenna section 210 of the contactless IC card 200 with a magnetic field strength that is sufficient to perform contactless communication. The communicable range of the loop antenna 111a is represented as a communicable range Ra, and the communicable range of the loop antenna 111c is represented as a communicable range Rc.

The antenna substrate 113a on which the loop antenna 111a is disposed and the antenna substrate 113c on which the loop antenna 111c is disposed are combined such that the two antenna substrates make an angle of θ therebetween. In addition, the antenna substrate 113a is disposed to further make an angle of φa with the reference plane P0. Further, the antenna substrate 113c makes an angle of φc with the reference plane P0. Adjusting the aforementioned angles θ, φa and φc allows adjustment of the directivity directions Da and Dc of the loop antennae 111a and 111c.

For example, if the angle φa made by the reference plane P0 and the antenna substrate 113a is adjusted, it becomes possible to make the communicable range Ra, which extends in the directivity direction Da, tilt with respect to the reference plane P0 and intersect the reference plane P0. In such a case, the size of the communicable range RaP0 above the reference plane P0 becomes larger than the size of the loop antenna 111a. That is, the communicable range RaP0 can be extended to more than the area of the loop plane of the loop antenna 111a. Similarly, if the angle φc made by the reference plane P0 and the antenna substrate 113c is adjusted, it becomes possible to extend the communicable range RcP0 above the reference plane P0 to more than the area of the loop plane of the loop antenna 111c. Although the description has been made of the loop antennae 111a and 111c with reference to FIG. 4, it is also possible to extend the communicable range of each of the loop antennae 111b and 111d whose angle with respect to the reference plane can be similarly adjusted to more than the area of the loop plane of each loop antenna.

FIG. 5 is an explanatory diagram illustrating an example of wires of the antenna section 110 of the reader/writer 100 in accordance with the first embodiment of the present disclosure. Referring to FIG. 5, the loop antennae 111a to 111d are connected in parallel with an alternating-current power supply AC. The loop antennae 111a to 111d are supplied with currents Ia to Id, respectively by the alternating-current power supply AC. Note that the alternating-current power supply AC schematically represents the RF circuit 150 that supplies an alternating current to the antenna section 110. The loop antenna 111a and the loop antenna 111c are connected to the alternating-current power supply AC such that they are supplied with a current with an opposite phase to that of a current supplied to the loop antenna 111b and the loop antenna 111d. That is, the loop antenna 111a and the loop antenna 111c are connected to the alternating-current power supply AC such that their opposite (right and left) ends are interchanged as shown. Accordingly, each of the current Ia and the current Ic is shifted in phase from each of the current Ib and the current Id by a ½ period. That is, each of the current Ia and the current Ic is opposite in phase to each of the current Ib and the current Id. For example, the directions of currents that flow through the adjacent loop antennae at a given moment are opposite to each other such that at the moment when the current Ia flows clockwise through the loop antenna 111a in a top view, the current Ib flows counterclockwise through the loop antenna 111b in a top view. Such relationship is similarly established between any other two adjacent loop antennae, that is, between the loop antenna 111b and the loop antenna 111c; the loop antenna 111c and the loop antenna 111d; and the loop antenna 111d and the loop antenna 111a.

Note that the loop antennae 111a to 111d can be connected not in parallel with but in series with the alternating-current power supply AC as long as current supply with the phase difference described above is possible. In addition, the phase difference of the currents supplied to the respective loop antennae need not be generated by a circuit arrangement unlike in the aforementioned example. For example, a phase inverter circuit can be provided only for a circuit that supplies currents to some of the loop antennae so that currents with mutually opposite phases are supplied to the adjacent loop antennae.

Figure 6:
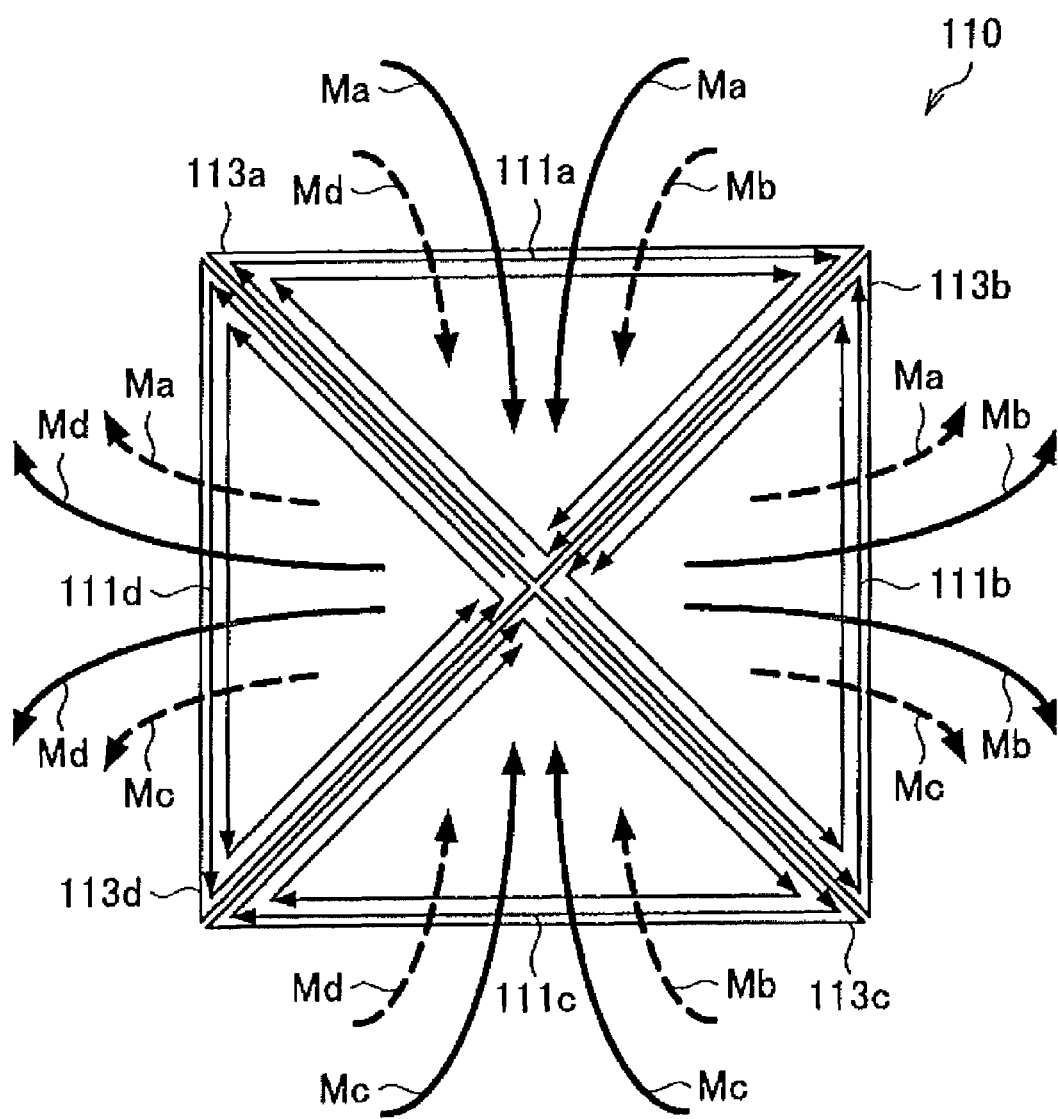
FIG. 6 is an explanatory diagram illustrating magnetic fields that are generated by the antenna section of the reader/writer in accordance with the same embodiment.

FIG. 6 is an explanatory diagram illustrating magnetic fields that are generated by the antenna section 110 of the reader/writer 100 in accordance with the first embodiment of the present disclosure at a given moment. Referring to FIG. 6, the antenna section 110 seen from above is shown. In addition, magnetic fields Ma to Md generated by the loop antennae 111a to 111d are represented by schematic magnetic field lines.

Herein, the direction of a current and a magnetic field are defined. First, the direction of a current that flows through a loop antenna is defined by whether it is a "clockwise" direction or a "counterclockwise" direction when the antenna section 110 is seen from above. In addition, the direction of a magnetic field generated by a loop antenna is defined by whether it is an "inward" direction toward the inside of the quadrangular pyramid shape, which is obtained by combining the antenna substrates 113a to 113d, or an "outward" direction toward the outside of the quadrangular pyramid shape.

First, an example of the loop antenna 111a will be described. At the moment shown in the drawing, a current flows clockwise through the loop antenna 111a as indicated by the arrows. In this case, an inward magnetic field Ma indicated by the solid lines is generated on the inner side of the coil of the loop antenna 111a. Meanwhile, the direction of the magnetic field Ma is opposite, namely, an outward direction in portions other than the inner side of the coil of the loop antenna 111a that generates the magnetic field. Accordingly, an outward magnetic field Ma indicated by the dashed lines is generated on the inner side of the coil of the loop antenna 111b that is adjacent to the loop antenna 111a.

Herein, as described with reference to FIG. 5 above, the loop antenna 111b that is adjacent to the loop antenna 111a is arranged such that the loop antenna 111b is supplied with a current with an opposite phase to that of the current supplied to the loop antenna 111a. Therefore, the direction of the current that flows through the loop antenna 111b at this moment is counterclockwise as indicated by the arrows. Thus, an outward magnetic field Mb indicated by the solid lines is generated on the inner side of the coil of the loop antenna 111b. The direction of the magnetic field Mb coincides with the direction of the magnetic field Ma indicated by the dashed lines on the inner side of the coil of the loop antenna 111b. Similarly, on the inner side of the coil of the loop antenna 111a, the direction of the magnetic field Ma indicated by the solid lines is inward, and the direction of the magnetic field Mb indicated by the dashed lines is also inward, which means that the directions of the two magnetic fields coincide. Accordingly, it can be said that the magnetic field Ma and the magnetic field Mb will not interfere with each other.

Further, as described with reference to FIG. 5 above, the loop antennae 111a to 111d that constitute the antenna section 110 are arranged such that currents with mutually opposite phases are supplied to each combination of the two adjacent loop antennae (the loop antenna 111a and the loop antenna 111b; the loop antenna 111b and the loop antenna 111c; the loop antenna 111c and the loop antenna 111d; and the loop antenna 111d and the loop antenna 111a). Thus, magnetic fields that are generated by two adjacent loop antennae among each combination of the two adjacent loop antennae have mutually opposite phases as can be seen in the aforementioned example of the magnetic field Ma and the magnetic field Mb. Accordingly, it can be said that magnetic fields that are generated by two adjacent loop antennae will not interfere with each other.

(1-4. Summary of the Embodiment)

In the first embodiment of the present disclosure described above, the antenna section 110, which includes a plurality of loop antennae 111 with different directivity directions, is used as a single high-directivity antenna. With such a configuration, it is possible to extend the communicable range to the directivity direction of each loop antenna 111. In addition, it is also possible to, by adjusting the directivity direction, set the communicable range to a shape that is adapted to an environment in which the reader/writer is set.

In this embodiment, the plurality of loop antennae 111 that constitute the antenna section 110 are arranged such that magnetic fields that are generated by the two adjacent loop antennae 111 have mutually opposite phases. With such a configuration, it is possible to prevent mutual interference of magnetic fields that are generated by the loop antennae, and sufficiently obtain the advantageous effect that the communicable range can be extended in the directivity direction of each loop antenna.

In this embodiment, the plurality of loop antennae 111 that constitute the antenna section 110 are disposed on the respective antenna substrates 113, and the plurality of antenna substrates 113 are combined stereoscopically. With such a configuration, the plurality of loop antennae 111 can be easily and stably combined stereoscopically.

In this embodiment, the antenna substrates 113 are combined such that they correspond to the respective side faces of a quadrangular pyramid shape. Accordingly, the antenna section 110 forms a quadrangular pyramid shape. In addition, the bottom face of the quadrangular pyramid shape is parallel with the reference plane P0. With such a configuration, it is possible to make the directivity direction of each loop antenna 111 extend radially toward the reference plane P0, whereby the communicable range can be extended three-dimensionally in a plurality of directions that extend radially above the reference plane P0.

In this embodiment, the number of the loop antennae disposed is four, namely, an even number. With such a configuration, each loop antenna can be arranged such that magnetic fields, which are generated by two adjacent loop antennae among each combination of the two adjacent loop antennae, have mutually opposite phases.

Although the description has been made of an example in which the antenna section has a quadrangular pyramid shape, the shape is not limited thereto. The aforementioned advantageous effect that the communicable range can be extended three-dimensionally in a plurality of directions that extend radially above the reference plane P0 can be obtained when the loop antennae form any given polygonal pyramid shape.

In addition, although the description has been made of an example in which the number of the loop antennae disposed is four, the number is not limited thereto. The advantageous effect that each loop antenna can be arranged such that magnetic fields, which are generated by each combination of the adjacent loop antennae, have mutually opposite phases, can be obtained when the number of the loop antennae disposed is any given even number like six or eight.

Further, although the quadrangular pyramid shape obtained by combining the antenna substrates is shown as a square pyramid shape in the drawing, the shape is not limited to the square pyramid shape. It is also possible to, it order to allow a given direction to coincide with the directivity direction of a loop antenna, combine the antenna substrates in a quadrangular pyramid shape with an eccentric apex.

2. Second Embodiment

Next, the second embodiment of the present disclosure will be described. The second embodiment is characterized in that magnetic materials 115a to 115d are disposed on the respective rear surfaces of the loop antennae 111a to 111d that constitute the antenna section 110 of the reader/writer 100.

Note that the second embodiment of the present disclosure differs from the first embodiment in that the magnetic materials 115a to 115d are attached to the respective rear surfaces of the loop antennae 111a to 111d, but other functions and structures are approximately the same as those in the first embodiment. Thus, detailed description thereof is omitted herein.

Figure 7:
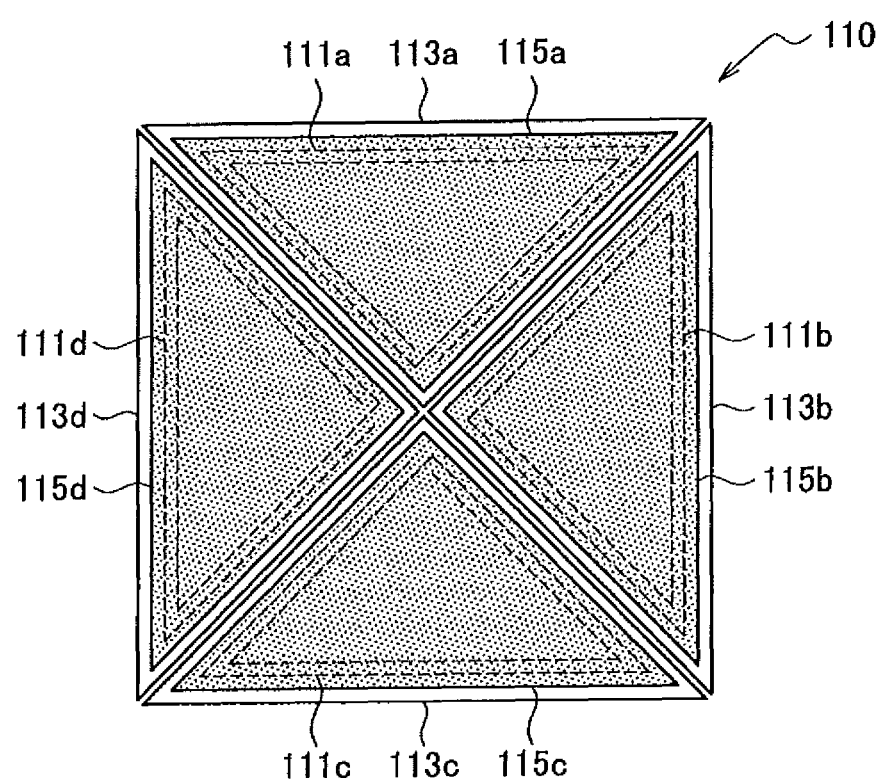
FIG. 7 is a schematic bottom view illustrating an antenna section of a reader/writer in accordance with the second embodiment of the present disclosure.

FIG. 7 is a schematic bottom view illustrating the antenna section 110 of the reader/writer 100 in accordance with the second embodiment of the present disclosure. The antenna section 110 includes four loop antennae 111a to 111d disposed on the antenna substrates 113c and 113d, respectively, which are combined in a quadrangular pyramid shape. In this embodiment, the magnetic materials 115a to 115d are disposed on the respective surfaces of the antenna substrates 113a to 113d that correspond to the respective rear surfaces of the loop antennae 111a to 111d. The magnetic materials 115a to 115d are so-called magnetic sheets formed by mixing soft magnetic powder into resin layers, and can be attached to the respective surfaces of the antenna substrates 113a to 113d. The magnetic materials 115a to 115d can be formed in approximately the same shape as the respective loop antennae 111c and 111d.

Note that the rear surfaces of the loop antennae 111a to 111d refer to surfaces of the loop antennae that are not opposite the reference plane P0. The term "opposite" herein does not necessarily mean that parallel planes are opposite each other, but also encompasses a meaning that planes are opposite each other at an angle. According to such definition, surfaces of the loop antennae 111c and 111d that face the inner side of the quadrangular pyramid shape, which is obtained by combining the antenna substrates 113a to 113d, are the rear surfaces.

Next, the advantageous effect of the magnetic materials 115a to 115d that are newly disposed on the antenna section 110 in this embodiment will be described with reference to FIGS. 8 and 9.

Figure 8:
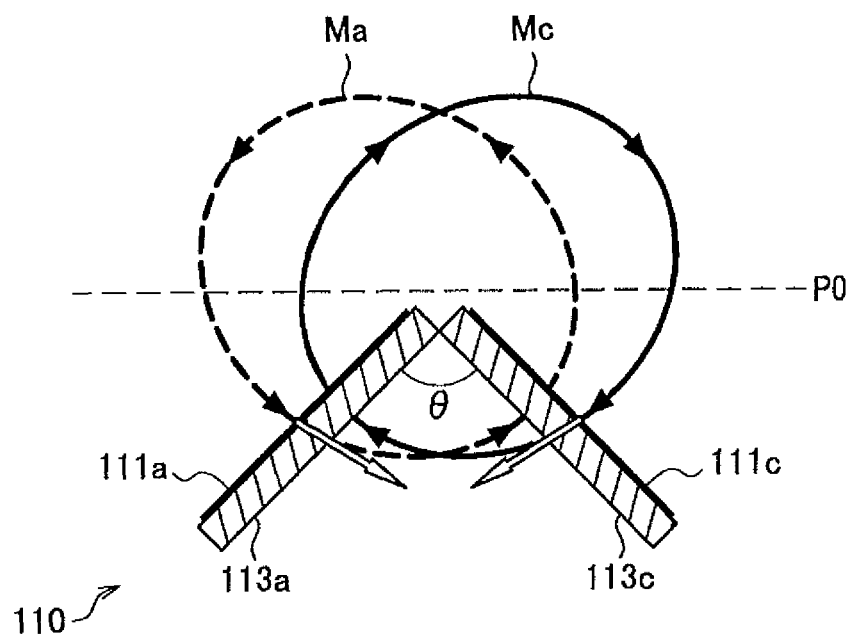
FIG. 8 is a schematic longitudinal sectional view illustrating magnetic fields that are generated by the antenna section of the reader/writer in accordance with the same embodiment.

FIG. 8 is a schematic longitudinal sectional view illustrating magnetic fields that are generated by the antenna section 110 when no magnetic material is disposed on the rear surface of each loop antenna. Herein, the loop antenna 111a and the loop antenna 111c will be described as an example. As shown, the loop antenna 111a and the loop antenna 111c are disposed on, among the antenna substrates 113a to 113d combined in a quadrangular pyramid shape, the antenna substrate 113a and the antenna substrate 113c, respectively, which correspond to the two opposite side faces of the quadrangular pyramid shape. A magnetic field Ma generated by the loop antenna 111a and a magnetic field Mc generated by the loop antenna 111c at a given moment are indicated by schematic magnetic field lines.

Herein, magnetic fields that are generated by two adjacent loop antennae among the loop antennae 111a to 111d have mutually opposite phases. The loop antenna 111c is a loop antenna adjacent to the loop antenna 111b that is further adjacent to the loop antenna 111a. Accordingly, a magnetic field generated by the loop antenna 111c is a magnetic field with an opposite phase to the opposite phase of a magnetic field generated by the loop antenna 111a, that is, a magnetic field with the same phase as that of the magnetic field generated by the loop antenna 111. In this case, at the moment when the direction of the magnetic field Ma within the coil of the loop antenna 111a (indicated by a hollow arrow as a tangent of a magnetic field line at the intersection with the loop antenna 111a) is toward the center of the quadrangular pyramid shape, the direction of the magnetic field Mc within the coil of the loop antenna 111c (indicated by a hollow arrow as a tangent of a magnetic field line at the intersection with the loop antenna 111c) is also toward the center of the quadrangular pyramid shape. That is, the magnetic field Ma and the magnetic field Mc are magnetic fields with the same phase. The directions of the magnetic fields are shown in the schematic longitudinal sectional view of FIG. 8. Specifically, the direction of the magnetic field Ma is counterclockwise, and the direction of the magnetic field Mc is clockwise.

As shown, the loop antenna 111a and the loop antenna 111c are combined stereoscopically at an angle of θ, thereby forming two opposite side faces of the quadrangular pyramid shape. In this case, a portion in which the magnetic field Ma overlaps the magnetic field Mc is generated. When the angle θ is set as in the example of FIG. 8, the magnetic field Ma overlaps the magnetic Mc in almost all portions including the inner portions of the coils of the loop antenna 111a and the loop antenna 111c. As the direction of the magnetic field Ma is counterclockwise and the direction of the magnetic field Mc is clockwise as described above, the magnetic field Ma and the magnetic field Mc would mutually interfere with each other in the overlapping portion, thereby weakening each other. As the magnetic field Ma and the magnetic field Mc weaken each other, the communicable range obtained by the loop antenna 111a and the loop antenna 111c becomes narrower. A similar phenomenon occurs for the loop antenna 111b and the loop antenna 111d that have a similar positional relationship.

Figure 9:
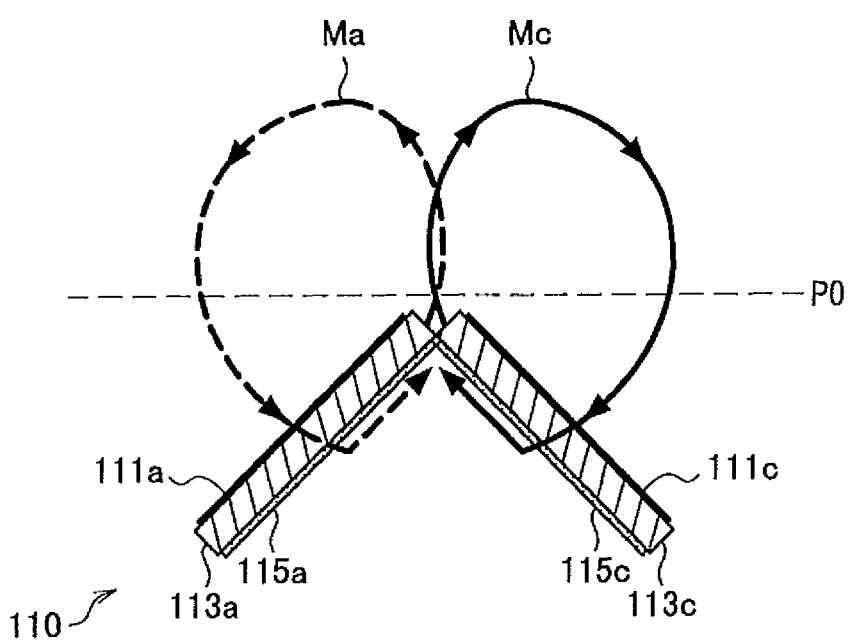
FIG. 9 is a schematic longitudinal sectional view illustrating magnetic fields that are generated by the antenna section of the reader/writer in accordance with the same embodiment.

Meanwhile, FIG. 9 is a schematic longitudinal sectional view illustrating magnetic fields that are generated by the antenna section 110 when a magnetic material is disposed on the rear surface of each loop antenna. Herein, the loop antenna 111a and the loop antenna 111c will be described as an example. The positional relationship between the loop antenna 111a and the loop antenna 111c is similar to that shown in FIG. 8. Therefore, detailed description is omitted herein.

Herein, the magnetic material 115a and the magnetic material 115c are provided to control the magnetic field Ma and the magnetic field Mc by utilizing a property that magnetic fields will be concentrated at the magnetic materials. For example, a magnetic field Ma generated within the coil of the loop antenna 111a is concentrated at the magnetic material 115a that is attached to the rear surface of the loop antenna 111a. Consequently, as a schematic magnetic field line that indicates the magnetic field Ma is concentrated at the magnetic material 115a, the magnetic field Ma is bent in a direction along the rear surface of the loop antenna 111a. The magnetic field Ma reaches the end of the magnetic material 115a on the side closer to the reference plane P0 along the rear surface of the loop antenna 111a, and then flows in an upward direction in the drawing. The magnetic field Mc is also bent in a direction along the rear surface of the loop antenna 111c as shown.

As described above, controlling the magnetic field Ma and the magnetic field Mc with the magnetic material 115a and the magnetic material 115c, respectively allows a reduction in the overlapping portion of the magnetic field Ma and the magnetic field Mc. Accordingly, it becomes possible to reduce mutual interference of the magnetic field Ma and the magnetic field Mc and prevent a reduction in the communicable range that is obtained by the loop antenna 111a and the loop antenna 111c. Note that if the magnetic material 115b and the magnetic material 115d are disposed on the loop antenna 111b and the loop antenna 111d, respectively, which have a similar positional relationship, a similar advantageous effect can be obtained.

In the second embodiment of the present disclosure described above, the magnetic material(s) 115 is/are attached to one or both of the rear surfaces of the two opposite loop antennae 111 among the plurality of loop antennae 111 that constitute the antenna section 110. According to such a configuration, it is possible to reduce mutual influence of magnetic fields that are generated by the two opposite loop antennae 111, and thus reduce mutual interference of the magnetic fields. As the mutual interference of the magnetic fields can be reduced, it is possible to fully exert the advantageous effect that the communicable range is extended by the plurality of loop antennae 111 that constitute the antenna section 110.

Note that magnetic materials need not necessarily be disposed on all rear surfaces of the loop antennae. For example, even when a magnetic material is disposed on one of the rear surfaces of the loop antennae that are arranged on the two opposite side faces of the quadrangular pyramid, it is possible to reduce mutual interference of magnetic fields that are generated by the respective loop antennae to a certain degree. In addition, the magnetic materials need not necessarily have approximately the same shape as the loop antennae. For example, even when a magnetic material has a shape that covers only part of the loop antenna, it is possible to reduce mutual interference of magnetic fields that are generated by the respective loop antennae to a certain degree.

3. Supplements

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although the aforementioned embodiments have illustrated examples in which loop antennae are disposed on triangular antenna substrates, and the antenna substrates are combined in a polygonal pyramid shape, the present disclosure is not limited thereto. For example, the antenna substrates can be square substrates or trapezoidal substrates, and can be combined in a projecting shape other than the polygonal pyramid. The projecting shape can be any shape as long as it is projecting toward the reference plane, such as a cylindrical shape, a conical shape, a conical frustum shape, a hemispherical shape, or a pyramidal frustum shape. Such a configuration can be used as needed when the existing loop antennae are used or when there are limitations in the space in building the reader/writer in a host device.

Although the aforementioned embodiments have illustrated examples in which the number of the loop antennae disposed is even, the present disclosure is not limited thereto. For example, the number of the loop antennae disposed can be odd. For example, when the communicable range should be extended only in three directions, the communicable range can be extended in the three directions as in the aforementioned embodiments by combining three loop antennae to form a quadrangular pyramid shape with the absence of a single side face.

Although the aforementioned embodiments have illustrated examples in which antenna substrates, on which loop antennae that constitute the antenna section of the reader/writer are disposed, are mutually in contact with each other, the present disclosure is not limited thereto. For example, when there are limitations in the space in building the reader/ writer in a host device, the antenna substrates can be arranged with constant gaps therebetween.

Although the aforementioned embodiments have illustrated examples in which a plurality of loop antennae are disposed on the respective antenna substrates, the present disclosure is not limited thereto. For example, the plurality of loop antennae can be independent coils that are not disposed on antenna substrates, and such coils can be mutually coupled together via coupling members and be combined stereoscopically.

Further, although the aforementioned embodiments have illustrated a contactless IC card as an example of a contactless communication device, the present disclosure is not limited thereto. For example, a mobile phone on which an RFID tag or a contactless IC chip is mounted can be used.

What is claimed is:

1. A communication device comprising:
an antenna section including a plurality of loop coils that are combined in a polygonal pyramid shape; and
a communication section configured to perform contactless communication with another communication device using the antenna section,
wherein the plurality of loop coils include two adjacent loop coils, and magnetic fields generated by the two loop coils have mutually opposite phases.

2. A communication device comprising:
an antenna section including a plurality of loop coils that are combined in a conical shape; and
a communication section configured to perform contactless communication with another communication device using the antenna section,
wherein the plurality of loop coils include two adjacent loop coils, and magnetic fields generated by the two loop coils have mutually opposite phases.

3. A communication device comprising:
an antenna section including a plurality of loop coils that are combined in a cylindrical shape; and
a communication section configured to perform contactless communication with another communication device using the antenna section,
wherein the plurality of loop coils include two adjacent loop coils, and magnetic fields generated by the two loop coils have mutually opposite phases.

4. A communication device comprising:
an antenna section including a plurality of loop coils that are combined in a projecting shape; and
a communication section configured to perform contactless communication with another communication device using the antenna section,
wherein the plurality of loop coils include two adjacent loop coils, and magnetic fields generated by the two loop coils have mutually opposite phases,
wherein the antenna section further includes a plurality of antenna substrates on which the respective loop coils are disposed, and has a stereoscopic shape formed by stereoscopically combining the plurality of antenna substrates, and
wherein the stereoscopic shape is a polygonal pyramid shape, and the antenna section forms the polygonal pyramid shape with the antenna substrates combined so as correspond to respective side faces of the polygonal pyramid shape.

5. The communication device according to claim 4, wherein the antenna section with the polygonal pyramid shape is arranged such that a bottom face of the antenna section is parallel with a reference plane that serves as a reference when the other communication device is held over the communication device.

6. The communication device according to claim 5, wherein the number of the plurality of loop coils disposed is even.

7. A communication device comprising:
an antenna section including a plurality of loop coils that are combined in a projecting shape;
a communication section configured to perform contactless communication with another communication device using the antenna section; and
a magnetic material disposed on at least one of rear surfaces of the plurality of loop coils,
wherein the plurality of loop coils include two adjacent loop coils, and magnetic fields generated by the two loop coils have mutually opposite phases.

8. A communication device comprising:
an antenna section including a plurality of loop coils that are combined in a pyramidal frustum shape; and
a communication section configured to perform contactless communication with another communication device using the antenna section,
wherein the plurality of loop coils include two adjacent loop coils, and magnetic fields generated by the two loop coils have mutually opposite phases.

9. A communication device comprising:
an antenna section including a plurality of loop coils that are combined in a hemispherical shape; and
a communication section configured to perform contactless communication with another communication device using the antenna section,
wherein the plurality of loop coils include two adjacent loop coils, and magnetic fields generated by the two loop coils have mutually opposite phases.

* * * * *